United States Patent
Jackson et al.

(10) Patent No.: US 10,668,404 B2
(45) Date of Patent: Jun. 2, 2020

(54) CHROMATOGRAPHY FILTER

(71) Applicant: Waters Technologies Corporation, Milford, MA (US)

(72) Inventors: Michael R. Jackson, Woonsocket, RI (US); Mark W. Moeller, Norton, MA (US)

(73) Assignee: Waters Technologies Corporation, Milford, MA (US)

( * ) Notice: Subject to any disclaimer, the term of this patent is extended or adjusted under 35 U.S.C. 154(b) by 185 days.

(21) Appl. No.: 15/377,095

(22) Filed: Dec. 13, 2016

(65) Prior Publication Data

US 2017/0165591 A1 Jun. 15, 2017

Related U.S. Application Data

(60) Provisional application No. 62/266,951, filed on Dec. 14, 2015.

(51) Int. Cl.
| | | |
|---|---|---|
| *B01D 15/12* | (2006.01) | |
| *G01N 30/20* | (2006.01) | |
| *B01D 39/20* | (2006.01) | |
| *G01N 30/60* | (2006.01) | |
| *G01N 30/02* | (2006.01) | |
| *G01N 30/38* | (2006.01) | |

(52) U.S. Cl.
CPC ....... *B01D 15/125* (2013.01); *B01D 39/2034* (2013.01); *B01D 39/2075* (2013.01); *G01N 30/20* (2013.01); *G01N 30/6052* (2013.01); *G01N 30/38* (2013.01); *G01N 2030/027* (2013.01)

(58) Field of Classification Search
None
See application file for complete search history.

(56) References Cited

U.S. PATENT DOCUMENTS

| | | | | | |
|---|---|---|---|---|---|
| 4,562,021 | A | * | 12/1985 | Alary | B01D 67/0048 210/500.27 |
| 5,366,620 | A | * | 11/1994 | Schick | G01N 1/4077 210/198.2 |
| 2004/0000510 | A1 | * | 1/2004 | Hoffman | B01D 19/0031 210/101 |

* cited by examiner

Primary Examiner — Ryan B Huang
(74) Attorney, Agent, or Firm — Schmeiser, Olsen & Watts LLP

(57) ABSTRACT

A filter for a chromatography system includes a filter body having an exterior wall, a cavity, an interior wall surrounding the cavity and a channel extending between the exterior and interior walls. The channel passes a flow of a liquid from the cavity. The filter body is formed of a sintered metal oxide material and has a pore size that is less than a particle size to be filtered liquid. In some embodiments the filter body is formed of zirconium oxide or aluminum oxide. The filters reduce or eliminate the types of reactions that occur between conventional filter bodies and chromatographic solvents and samples. The filters can be used at different locations in a chromatography system to remove particles that may be present in sources of chromatographic solvents or introduced into the chromatographic system flow by chromatographic components, such as pumps, valves and other chromatographic system components.

8 Claims, 5 Drawing Sheets

CHROMATOGRAPHY FILTER

RELATED APPLICATION

This application claims the benefit of the earlier filing date of U.S. Provisional Patent Application Ser. No. 62/266,951, filed Dec. 14, 2015 and titled "Chromatography Filter," the entirety of which is incorporated herein by reference.

FIELD OF THE INVENTION

The invention relates generally to a filter used to remove particulates from a fluid flow. More particularly, the invention relates to a sintered metal oxide filter used to remove particulates from a fluid flow in a chromatography system.

BACKGROUND

Particulates can be present in fluid flows such as the flows in a liquid chromatography system. The particulates may exist in the solvents used for the mobile phase or may be generated within the system by surfaces that move against each other. For example, internal pump components and solvent selector components can generate particulates during operation. Conventional chromatography systems sometimes utilize sintered metal filters, polymer filters and glass filters to remove particulates from the fluid stream. For example, such filters may be used to purify one or more solvents used for a mobile phase by removing particulates at the source of the solvent. These filters can also be used at the inlet or outlet of wash solvent pumps and other system pumps, and may be used to filter a sample for injection into the mobile phase. In addition, these filters are commonly provided at the inlet and outlet of a chromatographic column to retain sorbent particles inside the column while also removing particulates that may be present in the flow to the column.

Conventional filters such as polymer filters, sintered metal filters and glass filters can significantly react with the solvents used by the chromatography system. In addition, such filters may react with a chromatographic sample. These interactions can reduce the sensitivity or otherwise degrade the chromatographic separation data for the liquid chromatography system. For example, metal and glass filters can go into solution with certain solvents and potentially precipitate downstream in the fluid path. Dissolved metal and glass compounds can combine with sample compounds, resulting in changes to the physical properties of the sample compounds. These changes can alter the separation of the compounds and adversely affect the ability to detect and quantify the compounds. For mass spectrometry analysis, the mass of compounds may be changed through interactions with the filter material, leading to degradation of the mass spectrometry without the knowledge of the user. Other types of filters, such as plastic filters and the additives used in plastic filters, can solubilize into certain mobile phases and create compounds that interfere with or otherwise complicate the identification and quantitation of the analyte compounds.

SUMMARY

In one aspect, the invention features a filter for a chromatography system. The filter includes a filter body having an exterior wall, a cavity, an interior wall surrounding the cavity and a channel extending between the exterior and interior walls. The channel is configured to pass a flow of a liquid from the cavity. The filter body is formed of a sintered metal oxide material and has a pore size that is less than a particle size to be filtered from the flow of the liquid.

In another aspect, the invention features a filter for a chromatography system. The filter includes a filter body having a first wall and a second wall. The filter is configured to pass a flow of a chromatography liquid received at the first wall through the second wall after passing through at least a portion of the filter body. The filter body has an inlet port configured to receive the flow of the chromatography liquid and an outlet port configured to pass a flow of a filtered chromatography liquid. The filter body is formed of a sintered metal oxide material and has a pore size that is less than a particle size that is filtered from the chromatography liquid.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

As detectors for chromatographic systems become more sensitive to analytes in the eluent of a chromatographic column and as other components of chromatographic systems exhibiting improved performance are developed, the chemical reactivity of filters used in chromatographic systems with solvents and analytes present in samples to be analyzed becomes more important.

In brief overview, embodiments of a filter for chromatography described herein are include a filter body having an exterior wall, a cavity, an interior wall that surrounds the cavity and a channel that extends between the exterior and interior walls and configured to pass a flow of liquid from the cavity. In some embodiments, the filter body has the shape of a hollow cylinder with the channel disposed at one end of the cylinder. A conduit extends into or through the channel and may extend into the cavity. In some embodiments, the cavity extends from the end of the channel such that the cavity and channel are formed as a single bore in the filter body and a conduit extends partially into the bore. In other embodiments, the filter body is formed as a solid body (i.e., without an internal cavity) between an inlet port and an outlet port. In the various embodiments, the filter body is formed of a sintered metal oxide material having a pore size that is less than the size of particles to be filtered from the liquid. Advantageously, the sintered metal oxide filter body remains generally chemically inactive with respect to solvents and analytes. Thus separations performed with embodiments of filters according to the teachings herein can result in more accurate chromatograms.

Figure 1:
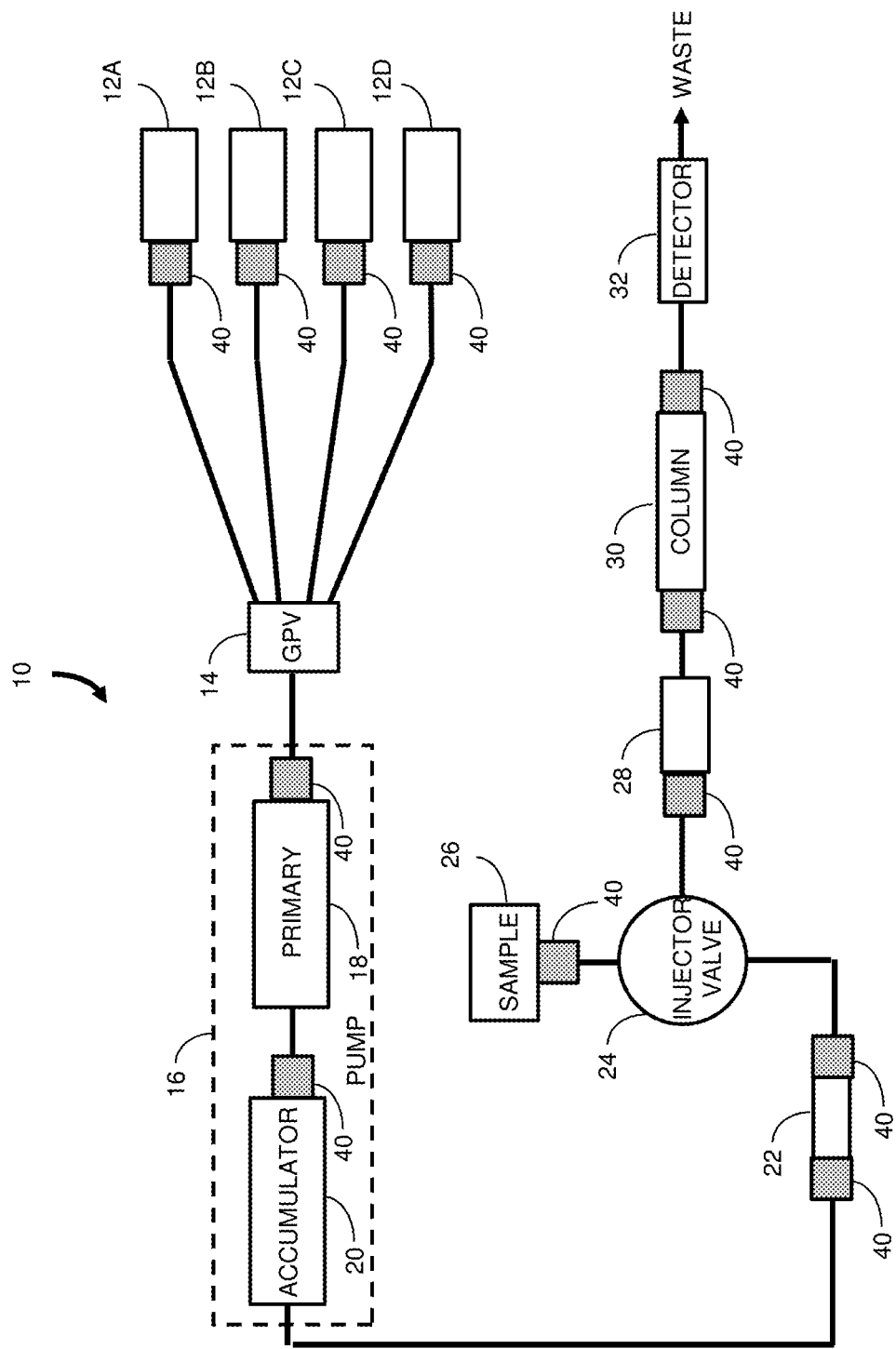
FIG. 1 is a block diagram of a liquid chromatography system configured for low pressure formation of a gradient mobile phase and showing locations where a chromatographic filter may be used.

FIG. 1 shows a block diagram of a liquid chromatography system 10 configured for low pressure formation of a gradient mobile phase. The system 10 includes multiple solvent reservoirs 12A to 12D (generally 12) that are coupled through tubing to a gradient proportioning valve (GPV) 14. Each solvent reservoir 12 holds a chromatographic solvent that can be provided in a system flow with one or more of the other solvents to create a gradient mobile phase consisting of sequential contributions of the corresponding solvents to the flow. A pump 16 receives the gradient mobile phase from the GPV 14 and provides a pressurized gradient mobile phase at its outlet. The pump 16 may include a primary pump head 18 and an accumulator pump head 20 as is known in the art. The high pressure gradient mobile phase is received at a mixer 22 which homogenizes the gradient mobile phase composition. An injection valve 24 enables a sample from a sample source 26, such as a sample manager, to be injected into the gradient mobile phase. The gradient mobile phase, including the sample to be analyzed, is provided to a preheater module 28 before being received at a chromatographic column 30. The eluent from the column 30 is received by a detector 32, such as a flow cell detector, before flowing to waste.

Figure 2:
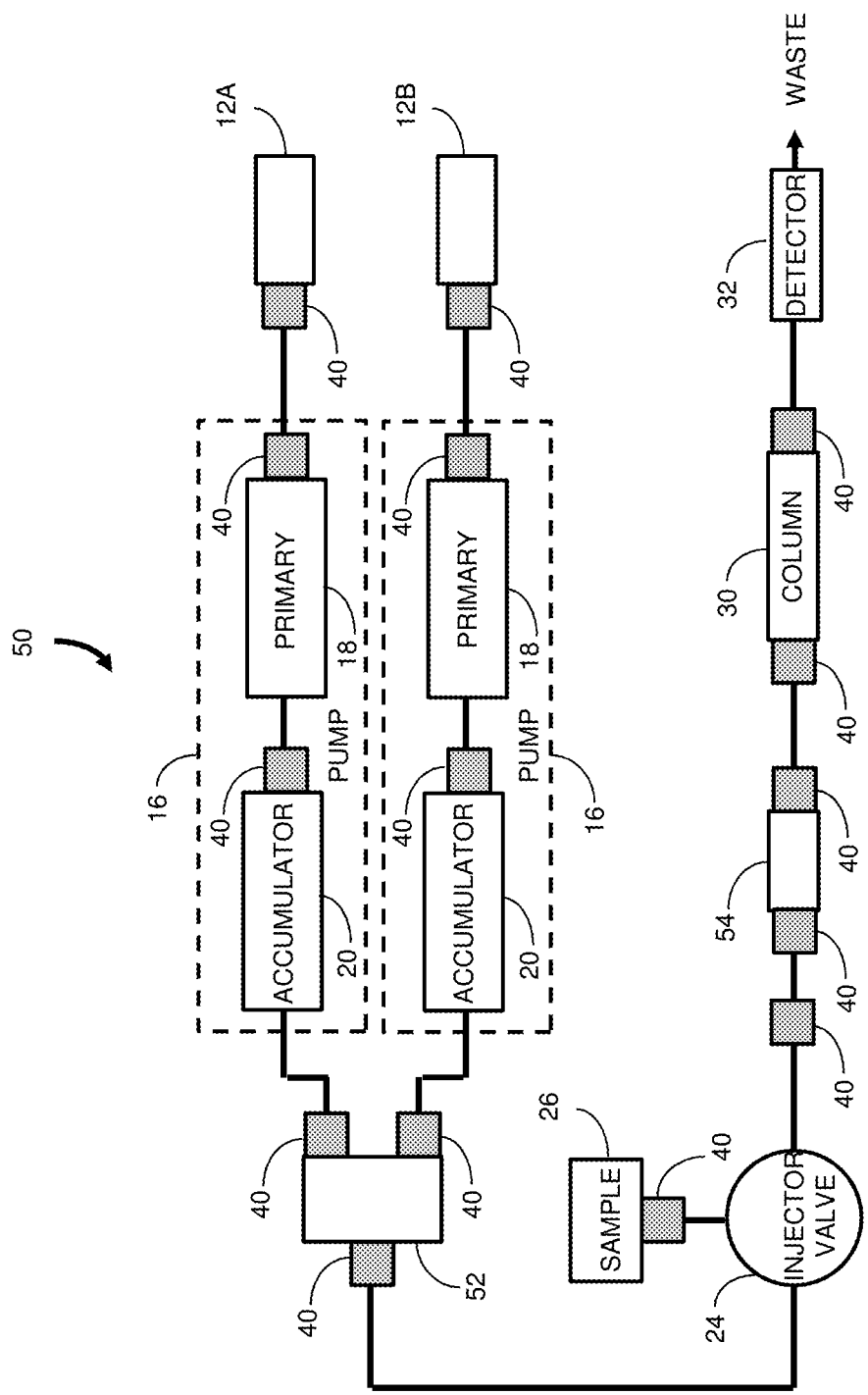
FIG. 2 is a block diagram of a liquid chromatography system configured for high pressure formation of a gradient mobile phase and showing locations where a chromatographic filter may be used.

Reference is also made to FIG. 2 which shows a block diagram of a liquid chromatography system 50 configured for high pressure formation of a gradient mobile phase. The system 50 includes solvent reservoirs 12A and 12B that are coupled to high pressure pumps 16A and 16B, respectively, to provide high pressure flows of the two solvents. Each pump 16 may include a primary pump head 18 and an accumulator pump head 20. The high pressure flows are received by a mixer 52 which provides a high pressure binary gradient mobile phase at its outlet. An injection valve 24 enables a sample from a sample source 26 to be injected into the gradient mobile phase. The gradient mobile phase, including the sample to be analyzed, is provided to an optional pre-column 54 before being received at a chromatographic column 30. The eluent from the column 30 is received by a detector 32 before flowing to waste.

Sources of particulates that may be introduced within the systems 10 and 50 include components having moving parts such as solvents select valves (not shown), the GPV 14 and pumps 16. As the systems operate over time, seal wear in the pumps 16 can contribute particulates. Particulates present in the tubing at the time of system integration can also enter the system flow. Although not illustrated, the systems 10 and 50 may also include one or more wash solvent reservoirs and wash solvent pumps where particulates may enter the flow of wash solvent.

Elements 40 are included in FIG. 1 and FIG. 2 to show the desired or optional filter locations for filters used to remove particulates. Conventional particulate filters such as polymer filters and sintered metal filters glass filters are often used. Although these types of filters can provide the desired result of removing particulates from the flows, in some instances the filters react with the liquid so that the detection process is adversely affected and the separation accuracy is compromised.

Embodiments of filters described herein can be used at the filter locations 40 along the flows in the chromatography systems 10 and 50. For example, a filter can be provided at the outlet where each solvent is drawn from its reservoir 12 so that particular matter that is present in the solvent as acquired or subsequently introduced into the reservoir container is removed from the flow of liquid to the GPV 14 and pump(s) 16. In some embodiments, the filter is in the form of a "sinker" which is disposed inside the reservoir 12 and the filtered solvent is drawn upward through tubing coupled to the GPV 14 or pumps 16. Filters can also be used at or downstream from the outlet of wash solvent pumps (not shown), at the inlet of the pump(s) 16 and, more specifically, may be used at the inlets of the primary pump head 18 and accumulator pump head 20. Other possible locations 40 for filters include the inlet and outlet of the mixers 22 and 52, in the sample flow path from the sample source 26, at the inlet of the column preheater 28, and at the inlet and outlet of the pre-column 54. The inlet and outlet of the chromatographic column 30 may each include a filter to retain the chromatographic sorbent as well as to remove particulate matter from the flow. Optionally, an additional filter may also be included upstream from the filter at the column inlet.

In some embodiments of filters described herein, the filter is replaceable with a similar filter, for example, at the time of a regularly schedule preventative maintenance or when it is determined that a filter is clogged such that the flow through the filter is restricted. Filters provided as part of a chromatographic column assembly are not individually replaced but are replaced as part of the entire assembly.

It should be noted that the size and shape of embodiments of filters formed according to the principles described herein can vary and that there can be external structure attached to each filter that may be different according to the filter location 40. For example, the filters at the outlet of the solvent reservoirs 12 may be sinker filters while the filters at various other locations may be provided with fluidic couplings or other structure to allow connection to a conduit or a corresponding chromatographic component. By way of example, the chromatographic system component can be a solvent pump, a gradient pump, a mobile phase pump, a wash pump, an injection valve, a mixer and a pre-column.

Figure 3:
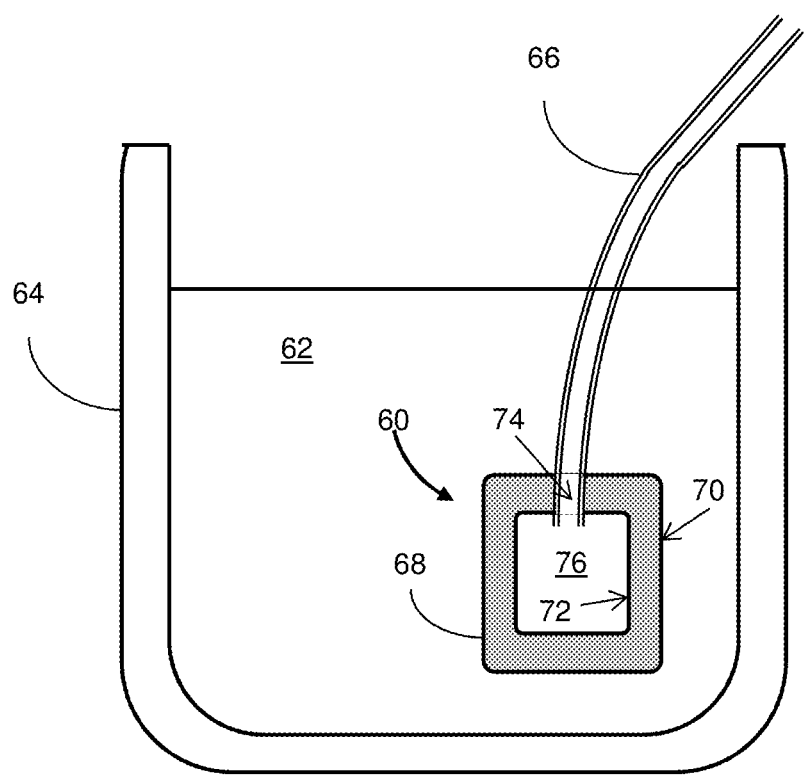
FIG. 3 is a cross-sectional simplified diagram of an embodiment of a solvent filter disposed in a solvent reservoir.

FIG. 3 is a cross-sectional illustration of a solvent filter 60 disposed as a "sinker filter" immersed in a volume of solvent 62 contained in a solvent reservoir 64. The filter 60 is secured to one end of a conduit 66, such as a tubing, that conducts the filtered solvent to another component of a liquid chromatography system. For example, the filtered solvent may flow through the tubing 66 toward a GPV in a low pressure gradient LC system or toward a pump in a high pressure gradient LC system. The filter 60 may be used to replace a conventional two part filter where one part is cup-shaped and the other part is disposed at the opening in the cup and is adapted for receiving the tubing, for example, as a barb fitting. The illustrated filter 60 includes a filter body 68 made from a sintered metal oxide material and having an exterior wall 70 and an interior wall 72. A channel 74 extends between the exterior and interior walls 70 and 72, and leads to a cavity 76. Although not shown, a fluid coupling may be provided in or adjacent to the channel 74 to couple the tubing 66 to the filter body 68. Liquid drawn through the tubing 66 first has to pass through the filter body 68 and into the cavity 76, that is, through the exterior wall 70 and then the interior wall 72. Particles having a size that is less than the pore size of the filter body 68 are removed from the liquid during passage through the filter body 68.

Figure 4A:
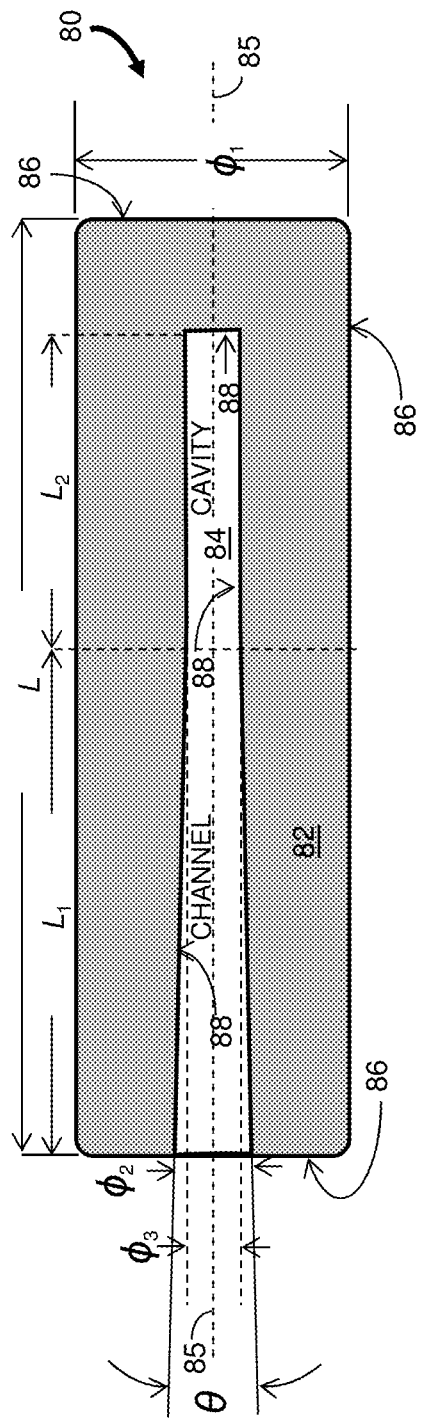
FIG. 4A and FIG. 4B are a cross-sectional side view and an end view, respectively, of an embodiment of a solvent filter for a solvent reservoir.
Figure 4B:
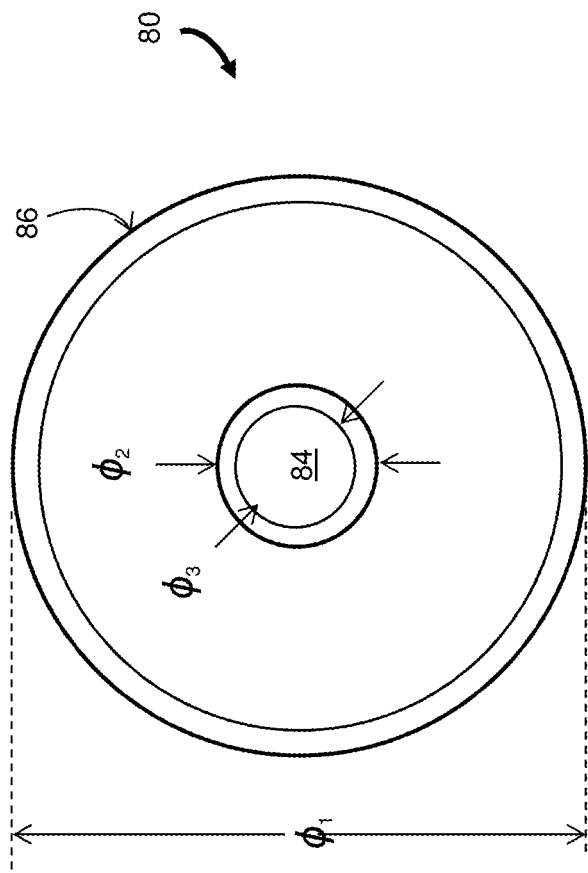

FIG. 4A and FIG. 4B are a cross-sectional side view illustration and an end view illustration, respectively, of another embodiment of a solvent filter 80. The filter 80 has a filter body 82 with a nominal cylindrical shape of length L and diameter $\phi_1$. The filter body 82 includes a cavity 84 defined by a portion of a central bore disposed along a body axis 85. The central bore extends through a channel defined from one end of the filter body 82 for a length $L_1$ along which the central bore tapers down from a diameter $\phi_2$ to a diameter $\phi_3$. The central bore continues into the filter body 82 for an additional length $L_2$ through the cavity 84 where the bore diameter $\phi_3$ remains constant. In one embodiment, the filter body 82 has a nominal pore size of approximately 0.2 μm, lengths L, $L_1$ and $L_2$ of 0.80 in. (20 mm), 0.45 in. (11 mm) and 0.25 in. (6 mm), respectively, diameters $\phi_1$ and $\phi_3$ of 0.45 in. (11 mm) and 0.090 in. (2.3 mm), respectively, and a taper full angle θ of 4°.

The solvent filter 80 is formed as a sintered metal oxide body having a pore size selected to prevent particles of a specified minimum particle size from passing from outside an exterior wall 86, through the interior wall 88 and into the cavity 84. The formation process preferably achieves a uniform porosity through the filter body 82 and may include use of specific forces, direction of application of the forces and certain numbers of press cycles. The filtering characteristic is determined in part by the nominal pore size of the filter body 82. By way of a specific non-limiting numerical example, a nominal pore size of 0.2 um may be used for filtering particles having a particle size of approximately 2 um or greater from the solvent. The pore size is determined in part from the particle size of the metal oxide powder used in a sintering process to form the filter body. In some embodiments the particle size of the powder used to form the filter body 82 is similar to the desired pore size. The metal oxide powder can be combined with a binder material to enable formation of a green body ceramic structure. The binder material is burned off during the sintering process in which the temperature is substantially increased but remains below the melting temperature for the powder to maintain accurate control of the pore size. In some embodiments the filter body 82 is formed of zirconium oxide which is chemically inactive with respect to most analytes and chromatographic solvents. Advantageously, zirconium oxide has high mechanical strength and fracture toughness. In alternative embodiments the filter body 82 is formed of aluminum oxide which is also generally chemically inactive with analytes and chromatographic solvents. By way of example, zirconia and alumina that can be sintered into a filter body are available from Kyocera Corporation of Kyoto, Japan.

The filter 80 can be attached to tubing (not shown) by inserting the tubing into the channel, that is, along the length $L_1$ of the tapered portion of the central bore. No special tools are required for installation and the filter 80 can be quickly installed to replace a clogged filter or to replace a filter during a routine maintenance procedure. The outer diameter of the tubing is less than the diameter $\phi_2$ of the bore opening and greater that the diameter $\phi_3$ of the cavity 84 so that the filter body 82 can be secured to the tubing by an interference fit within the channel as defined by the tapered region. If the tubing were to be inserted through most of the length $L_1+L_2$ of the central bore 68, most of the filter body 82 would not be in the active solvent flow and therefore would not contribute to the filtering process. To ensure that this limitation does not occur, the taper and the smaller diameter $\phi_3$ of the cylindrical portion of the central bore prevent the tubing from being inserted too far into the filter body 82.

Solvent outside the filter 80 is drawn through the filter body 82 by a pump located downstream in the liquid chromatography system. The solvent passes through the exterior wall 86 and exits through the interior wall 88 into the cavity 84 before being drawn through the tubing and conducted downstream to other system components. The pressure drop across the solvent filter 80 is determined in part by the pore size of the filter body 82. For example, the pressure drop may be a few tenths of a pound per square inch (psi) (a few kilopascal (kPa)) at the desired solvent flow rate. By way of a specific example, the solvent flow rate may be approximately 15 ml/min to maintain a pressure drop that is significantly less than atmospheric pressure to enable the solvent to be drawn from the solvent reservoir through the filter 80 without adverse effects. If the pressure drop is high (e.g., greater than 5 psi (35 kPa)), the filter 80 may cause cavitation.

Figure 5A:
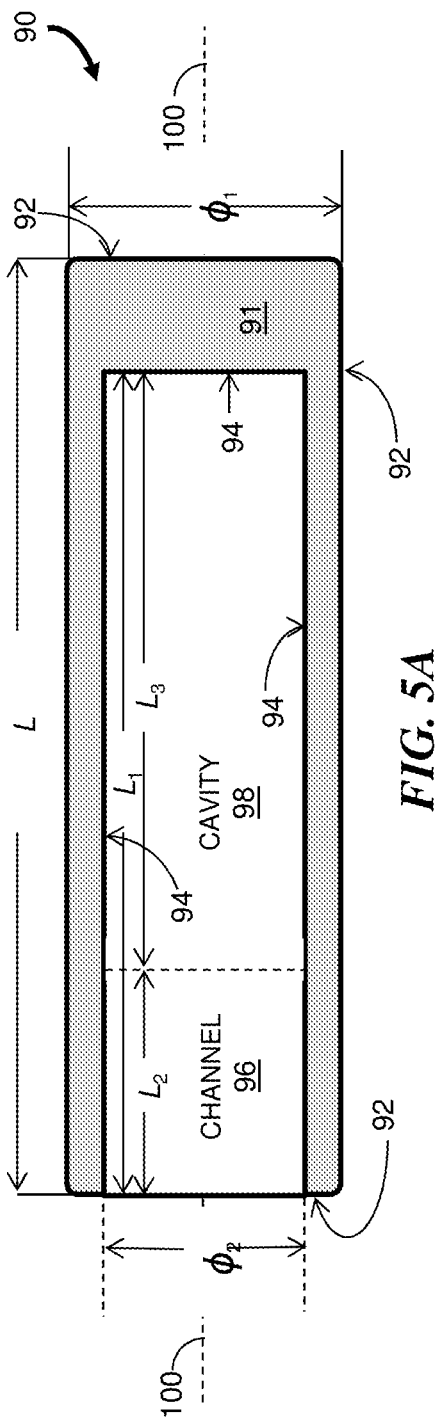
FIG. 5A and FIG. 5B are a cross-sectional side view and an end view, respectively, of another embodiment of a solvent filter for a solvent reservoir.
Figure 5B:
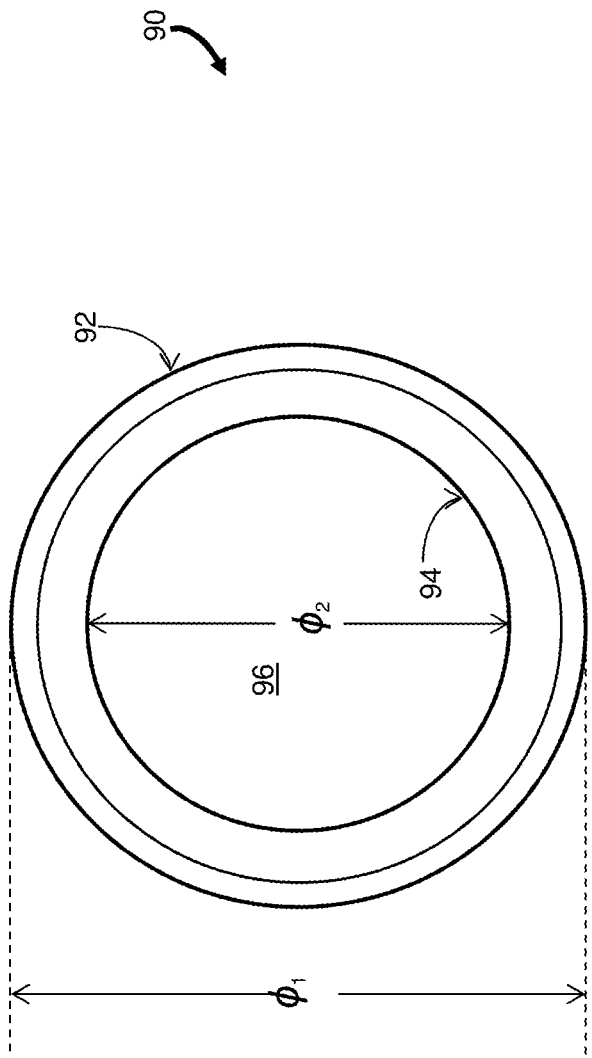

FIG. 5A and FIG. 5B are a cross-sectional side view and an end view, respectively, of an alternative embodiment of a solvent filter 90. The filter body 91 is formed of a sintered metal oxide material. The filter body 91 has a nominal cylindrical shape of length L and diameter $\phi_1$, and includes an exterior wall 92, an interior wall 94, and a channel 96 and cavity 98 each defined by a central bore disposed along a body axis 100. The bore has a diameter $\phi_2$ and extends from a surface at one end of the filter body 91 for a length $L_1$. The diameter $\phi_2$ along the length $L_2$ of the channel 96 has a tolerance sufficient to enable a secure press fit of an end cap (not shown) of similar diameter partially inserted into the filter body 91. The end cap seals the open end of the filter body 91 and is configured to pass the tubing or other form of conduit through the end cap and into the channel 96. In one embodiment the end cap is formed of polytetrafluoroethylene (PTFE) (available as Teflon® from E. I. du Pont de Nemours of Wilmington, Del.). In an alternative embodiment the end cap is made of the same material as the filter body 91 and a fluidic seal is maintained between the end cap and the filter body 91, and between the outer surface of the tubing and the end cap. Preferably the end cap has a T-shaped cross-section where the "stem" of the end cap extends into the channel 96 by a length that is less than the channel length $L_2$ so that a volume defined along a length of $L_3$ or greater of the cavity 98 is available to receive the solvent that passes from the exterior wall 92 and through the interior wall 94.

In one embodiment, the filter body 91 has a nominal pore size of approximately 0.2 μm, lengths L, $L_1$, $L_2$ and $L_3$ of 0.80 in. (20 mm), 0.70 in. (18 mm), 0.20 in. (5 mm) and 0.50 in. (13 mm), respectively, and diameters $\phi_1$ and $\phi_2$ of 0.45 in. (11 mm) and 0.33 in. (8 mm), respectively.

Those skilled in the art will recognize that other shapes and forms of a filter body formed of sintered metal oxide are contemplated. For example, the filter body can be formed with a hollow stem portion extending away from the channel and cavity so that a tubing to conduct a liquid from the filter is attached by sliding the tubing over the stem.

Although described above primarily with respect to liquid chromatography systems, filters according to the principles disclosed herein can be used in other types of chromatography systems. For example, the filters may be used in a gas chromatography system where temperatures can be substantially greater than those used in a liquid chromatography system. The filters can also be used in a supercritical fluid chromatography system, such as a chromatography system using supercritical carbon dioxide ($CO_2$), as long as each filter is compatible with the phase (liquid, supercritical or gaseous) of the fluid at the filter location.

While the invention has been shown and described with reference to specific preferred embodiments, it should be understood by those skilled in the art that various changes in form and detail may be made therein without departing from the spirit and scope of the invention as defined by the following claims.

The invention claimed is:

1. A filter for a chromatography system comprising:
a filter body having an exterior wall, a cavity, and an interior wall surrounding the cavity and a channel extending between the exterior and interior walls, the channel configured to pass a flow of a liquid from the cavity, the filter body formed of a sintered metal oxide material and having a pore size that is less than a particle size to be filtered from the flow of the liquid;
wherein a tubing is attachable to the filter body by an interference fit between the channel and the tubing so that the tubing passes through the channel to enter the cavity surrounded by the interior wall of the filter body, and an end of the tubing resides within the cavity.

2. The filter of claim 1 wherein the sintered metal oxide material is zirconium oxide.

3. The filter of claim 1 wherein the sintered metal oxide material is aluminum oxide.

4. The filter of claim 1 further comprising a solvent reservoir and wherein the filter body and the end of the tubing secured to the filter body are disposed in the solvent reservoir.

5. The filter of claim 1 further comprising a fluidic coupling secured to the filter body proximate to the channel and configured to receive the tubing, the fitting providing a fluidic pathway from the cavity to the tubing.

6. The filter of claim 1 further comprising a fluidic coupling secured to the filter body proximate to the channel and configured to communicate with a pump.

7. The filter of claim 1, wherein a length of the channel is defined by a distance between the interior wall and the exterior wall of the filter body.

8. The filter of claim 4, wherein the exterior wall of the filter body contacts a solvent in the solvent reservoir.

* * * * *